(12) United States Patent
Drerup et al.

(10) Patent No.: US 7,526,595 B2
(45) Date of Patent: Apr. 28, 2009

(54) DATA PATH MASTER/SLAVE DATA PROCESSING DEVICE APPARATUS AND METHOD

(75) Inventors: Bernard Charles Drerup, Austin, TX (US); Richard Siegmund, Jr., Austin, TX (US); Barry Joe Wolford, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 10/202,722

(22) Filed: Jul. 25, 2002

(65) Prior Publication Data

US 2004/0019721 A1    Jan. 29, 2004

(51) Int. Cl.
*G06F 13/36* (2006.01)
(52) U.S. Cl. .................. 710/311; 710/110; 710/113; 710/317
(58) Field of Classification Search ............... 710/306, 710/110, 113, 311, 317
See application file for complete search history.

(56) References Cited

U.S. PATENT DOCUMENTS

| | | | | |
|---|---|---|---|---|
| 4,633,388 A * | 12/1986 | Chiu | ........................ | 712/208 |
| 5,165,034 A | 11/1992 | Kanuma | | |
| 5,327,537 A | 7/1994 | Corcoran et al. | | |
| 5,664,142 A | 9/1997 | Boldt et al. | | |
| 5,872,986 A | 2/1999 | Heeb | | |
| 5,892,826 A * | 4/1999 | Brown et al. | ................ | 713/190 |
| 5,974,471 A | 10/1999 | Belt | | |
| 6,061,794 A * | 5/2000 | Angelo et al. | ............... | 713/200 |
| 6,081,860 A | 6/2000 | Bridges et al. | | |
| 6,145,069 A * | 11/2000 | Dye | .......................... | 711/170 |
| 6,173,381 B1 * | 1/2001 | Dye | .......................... | 711/170 |
| 6,219,724 B1 * | 4/2001 | Kim et al. | ..................... | 710/22 |
| 6,279,065 B1 * | 8/2001 | Chin et al. | ................... | 710/311 |
| 6,463,481 B1 * | 10/2002 | Lupien et al. | ................ | 710/22 |
| 6,549,995 B1 * | 4/2003 | Schulz et al. | ............... | 711/202 |
| 6,553,430 B1 * | 4/2003 | Keller | .......................... | 710/5 |
| 6,625,671 B1 * | 9/2003 | Collette et al. | ............... | 710/52 |
| 6,851,056 B2 * | 2/2005 | Evans et al. | ................. | 713/193 |
| 6,883,079 B1 * | 4/2005 | Priborsky | ................... | 711/170 |
| 6,973,570 B1 * | 12/2005 | Hamlin | ...................... | 713/168 |
| 2004/0034768 A1 * | 2/2004 | Poldre | ........................ | 713/153 |

* cited by examiner

*Primary Examiner*—Glenn A Auve
*Assistant Examiner*—Nimesh G Patel
(74) *Attorney, Agent, or Firm*—CARR LLP; Matthew B. Talpis

(57) ABSTRACT

An apparatus and method is described for data processing in a computer system. The apparatus comprises a data processing device having a data processing master, a functionally coupled data processor core, and a functionally coupled data processor slave. Both the data processing master and the data processing slave are coupled to a common bus or common crossbar switch. The data processing device processes the data associated with transfers to or from the data processor slave. System masters will direct transactions that require data processing to the data processing slave, which will indirectly interact with the target memory slave. System masters will direct transactions that do not require data processing, directly to the target memory slave.

4 Claims, 4 Drawing Sheets

DATA PATH MASTER/SLAVE DATA PROCESSING DEVICE APPARATUS AND METHOD

TECHNICAL FIELD

This invention relates generally to data processing and, more particularly, to a data transfer wherein the data is processed before storage into or retrieval from a memory device.

BACKGROUND

In computer systems, there is often a need to process data as it is transferred to or from a main memory device, such as a memory slave. This data processing constitutes an important functionality of such systems.

One important example of such data processing comprises data compression and decompression. In some applications, it is desirable to minimize, for cost or area reasons, the size of main memory devices. It is therefore desirable to compress data as it is being written to the main memory, and to expand it as it is subsequently read back. This processing is advantageous in that it allows for efficient storage of data in main memory, while preserving the ability for subsequent reads to return the data to requesting master devices in an original, uncompressed format.

A second need, while transferring data to or from a main memory device in a computer system, involves security. Main memory is commonly located in devices that are external to the chip. The physical interface between the chip and these devices is exposed and often subject to easy observation. One solution for preserving security is to encrypt critical data as it is written to main memory, so that if observed, the original meaning is hidden.

There are several known methods for handling the processing of data that is directed to a main device, such as a main memory. A first conventional method is through the employment of a data processing bridge. In conventional systems, the data processing bridge is a connection for all transfers directed to main memory from a master, regardless of whether the data involved requires data processing. Typically, the data processing bridge accepts data as a slave from a master coupled to a first bus. The data processing bridge then transfers the data on a second bus to the main memory after performing any appropriate processing as indicated by the requesting master device.

However, a drawback and performance limitation of employing the conventional data processing bridge is the performance loss due to time required to accept data from a first bus and introduce it on the second bus, wherein the second bus is coupled to the target memory device. The "handshaking" required for address arbitration and acknowledgment reduces the overall bandwidth available to a main memory device and increases system delays, especially in applications where data is transferred using a large percentage of smaller sized transfers. In other words, all data passed through the bus pays a speed and bandwidth penalty, whether or not the data transferred requires data processing by the data processing bus.

A second conventional method is to include the processing functionality directly within the main memory device itself. This method has an advantage in that there is no inherent bandwidth loss due to converting data buses, as there was with the first conventional method. This is an approach that has drawbacks, however, because it increases the complexity and size of the main memory device and makes it a special purpose device. This specialization can also reduce the performance of the main memory device for applications that never need data processing support.

Therefore, there is a need for a data processing for use in computer systems that overcomes the shortcomings of existing data processors.

SUMMARY

In one aspect, the present invention comprises a data processor having a data processing master, a functionally coupled data processing core, and a functionally coupled data processing slave. Both the data processing master and the data processing slave are also each functionally coupled to a bus, wherein the bus is the same bus. The data processing slave is employable as a target of data transfers from/to a system master, for data that is to be processed.

In a second aspect, the present invention comprises a data path system employable for data processing in a computer system, comprising data processor having a data processing master, a functionally coupled data processing core, and a functionally coupled data processing slave. The data processing master is functionally coupled to an input of a crossbar switch, and the data processing slave is functionally coupled to a single way of the same crossbar switch. The data processing slave is employable as a target of data transfers to/from a system master, for data that is to be processed.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise. In a further embodiment, the computer program is embodied upon or within a computer program product, such as a floppy disk or compact disk, or other storage medium.

Figure 1:
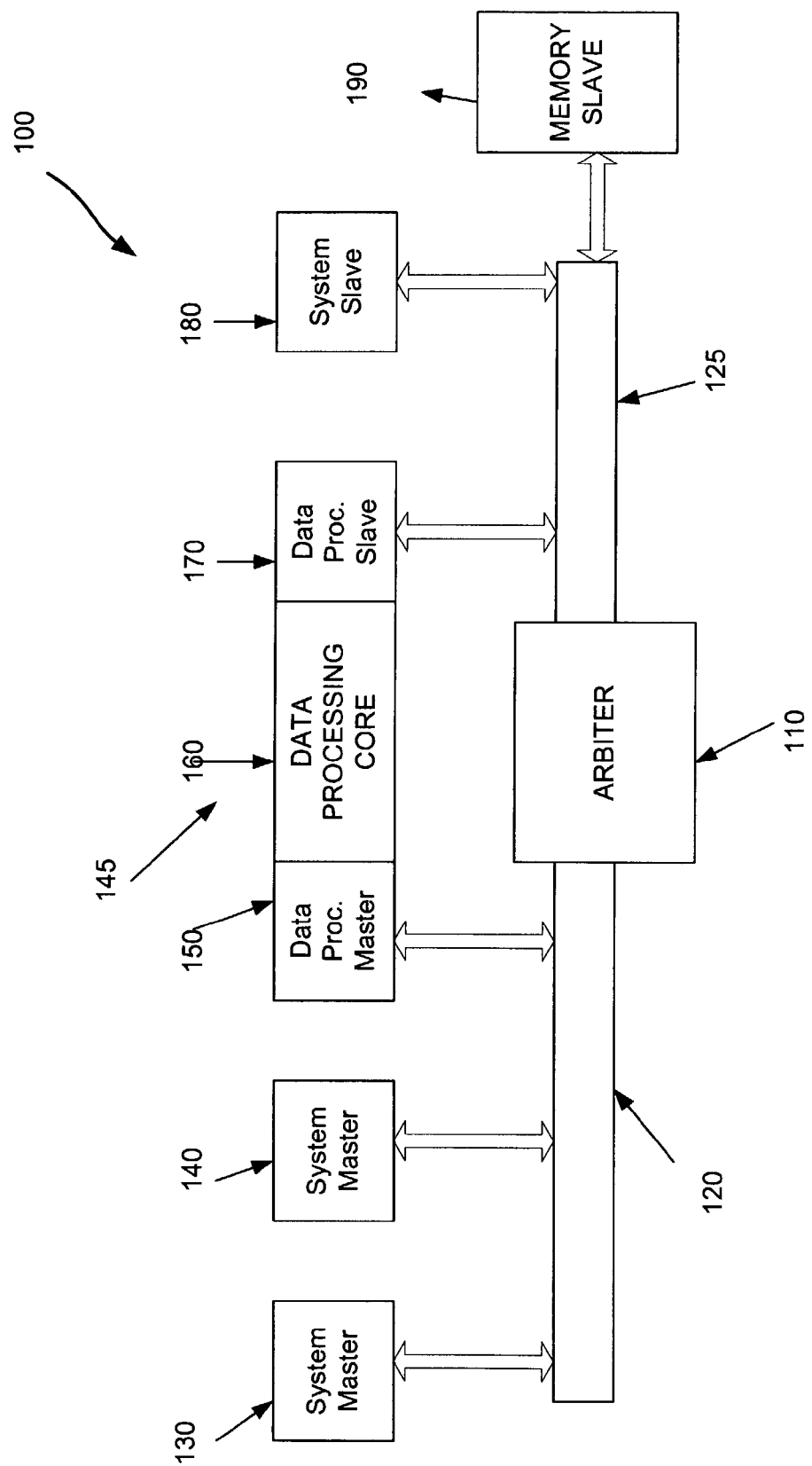
FIG. 1 illustrates a data path master/slave data processing device in a basic computer bus architecture.

Referring to FIG. 1, illustrated is an exemplary data path master/slave data processing system 100. Generally, the system 100 advantageously allows transfers of data from a master, such as system master 130 or 140, to a slave, such as system slave 180 or system memory slave 190, to be selectively routed through a data path data processor 145. The system 100 comprises a bus 120 coupled to an arbiter 110, masters 130, 140, and the data processing (DP) master 150 of the data processor 145. The system 100 further comprises a bus 125 coupled to a system slave 180, the memory slave 190, and a DP slave 170 of the data processor 145.

In one embodiment of FIG. 1, bus 120 and bus 125 are of the same speed. Individual masters such as 130, 140 and 150 can functionally directly connect to bus 125, with the permission of the arbiter 110. An arbiter may generally be defined as a logical control device or function that grants a master's request, at appropriate times, to allow it to use a common bus shared by a plurality of different slaves. In FIG. 1, the common bus is bus 125. The data processor 145 comprises the DP master 150 coupled to a DP core 160, which is coupled to the DP slave 170. Generally, the DP core 160 is a logical circuit or function that performs the required data processing on the appropriate data.

In FIG. 1, system master 130 on bus 120 intends to send and transfer data to be eventually written to memory slave 190 on bus 125. The data to be transferred from master 130 is to be data processed, such as by data compression or cryptographic encoding, although other data processing schemes are within the scope of the present invention. The master 130 sends the data onto bus 120, along with the requisite qualifier signals that indicate its desired destination as slave 170. Slave 170 accepts the data, and forwards it to the processing core 160. After the appropriate processing has been performed, the DP master 150 accepts the data and then requests permission of the arbiter 110 to transmit the processed data to the memory slave 190 using bus 125.

However, if the system master 130 has data to be sent to the memory slave 190 that does not need data processing, the master 130 requests permission to transmit the unprocessed data directly to the memory slave 190 through bus 125, without the intervention of any components of the data processor 145. This request is sent to the arbiter, along with the requisite qualifier signals which indicate the desired destination as memory slave 190.

The selective processing of data by the data processor 145 before transferral to the memory slave 190 is advantageous. Data that is in need of the data processing that the data processor 145 provides can be sent to the data processor 145 before this processed data is sent to the memory slave 190. However, data that is not in need of the data processing that the data processor 145 provides can be transmitted directly to the memory slave 190, without the need to pass through a data path data processor.

Among other things, the appropriate selection and direct transference of data to the memory slave 190 from the master 130, as opposed to passing all data to the memory slave 190 through a bridging data processor, advantageously reduces system 100 data transfer time. Data in need of the data processing that the data processor 145 provides can advantageously be processed without unduly interfering with or delaying data transfers from the system master 130 to the memory slave 190 that do not require such processing.

In another embodiment, the system master 130 initiates a process to read memory that is stored in the memory slave 190. This stored data is known to require processing by data processing core 160. The system master 130 begins this process by requesting processed read data from DP slave 170. DP slave 170 recognizes that this request requires unprocessed data from memory slave 190. Therefore, the DP slave 170 employs control logic of data processor 145 to indicate to the DP master 150 the data it requires from the memory slave 190.

Since the bus architecture of 100 allows read connections to be made between only a single master and a single slave at one time, DP slave 170 must reject the initial read request from the system master 130, in order to free up the read bus for use by the DP master 150. After the request of system master 130 is rejected, DP master 150 will issue a read request from memory slave 190, and data will eventually be returned. DP master 150 will forward this data to the DP core 160 for processing. Prior to the availability of the processed data, any repeated requests by system master 130 to DP slave 170 will be rejected.

After processing completes, the processed data remains in the DP core 160 until it is re-requested by system master 130. At this time, DP slave 170 will return the processed data to system master 130, thus completing the process. However, if the data to be read by the system master 130 from the memory slave 190 does not need data processing, the system master 130 issues a request directly to memory slave 190 for the data it requires.

The appropriate selection and direct transference of data from the memory slave 190 to the system master 130, as opposed to passing all data from the memory slave 190 through a bridging data processor, advantageously reduces system 100 data transfer time. The appropriate selection and direct transference of data from the memory slave 190 to the master 130, as opposed to passing all data from the memory slave 190 through a bridging data processor, also advantageously increases system 100 data bandwidth. Data that is in need of the data processing that the data processor 145 supplies can advantageously be processed, without unduly interfering with or delaying data transfers to the master 130 from the memory slave 190 that do not require such processing.

Figure 2:
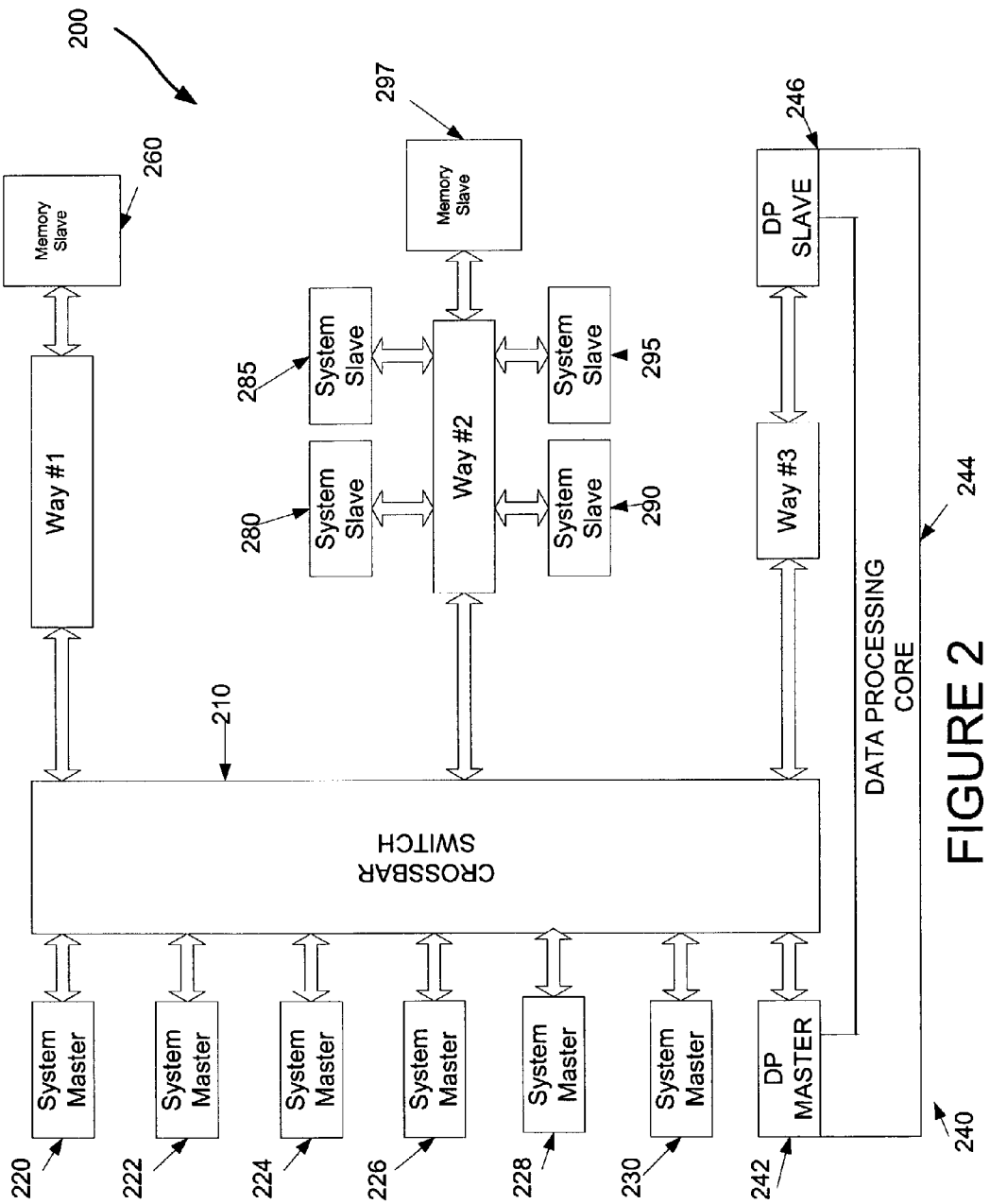
FIG. 2 illustrates a data path master/slave data processing device in a crossbar switch computer bus architecture.

Turning now to FIG. 2, illustrated is a data path master/slave data processing system 200 comprising a crossbar logical circuit and a plurality of ways. A crossbar, as is known to those of skill in the art, is generally defined as a logical device which can transfer data to or from any one of a plurality of separate masters to any one of a plurality of separate ways. Multiple such transfers from unique pairings of masters and ways can occur simultaneously. In this context, a way is generally defined as a unique slave data bus.

Generally, the system 200 advantageously allows select transfers of data to or from a master, such as master 230, to or from a slave, such as memory slave 297, to be first selectively routed through data processor 240 before it is rerouted to its final destination by the crossbar switch. Typically, however, data transfers that are not in need of data processing by the data processor 240 are routed directly from master to slave or slave to master without being routed through the data processor 240.

The system 200 comprises a crossbar switch 210 coupled to system masters 220, 222, 224, 226, 228, 230 and DP master 242 of data processor 240. The crossbar switch 210 is coupled to a way number ("#") 1, a way #2, and a way #3. The way #1 is coupled to a memory slave 260. The way #2 is coupled to slave 280, 285, 290, 295 and a memory slave 297. The way #3 is coupled to a DP slave 246 of the data processor 240. The data processor 240 comprises a DP master 242, a DP slave 246, and a DP core 244 interposed between the DP master 242 and the DP slave 246. In one embodiment, way #1, way #2 or way #3 are of a plurality of differing bus speeds. In one embodiment, a data processing master is functionally coupled to a master input of a crossbar switch.

In FIG. 1, master 222 intends to send data to the memory slave 260 located on way #1. However, the data that is to be sent to the memory slave 260 does need data processing. Master 222 will therefore issue a request to send data to the DP slave 246 located on way #3. DP slave 246 will accept the written data and forward it to DP core 244 for processing. Once processing has completed, the resulting data is forwarded to DP master 242, which will in turn issue a request to send data to memory slave 260 located on way #1.

As is understood by those of skill in the art, the crossbar switch 210 allows for the simultaneous connection of more than one master/way pair. In the illustrated embodiment, therefore, the connection between master 222 and way #3 can exist at the same time as the connection between DP master 242 and way #1. DP core 240 takes advantage of this capability.

In another embodiment, master 222 intends to retrieve data from the memory slave 260 located on Way #1. However, the data that is to be read does require data processing. Master 222 will therefore issue a request to read data from DP slave 246 located on way #3. DP slave 246 will accept the request and forward it to DP master 242, which will in turn issue a request to read data from memory slave 260 located on way #1. In this embodiment, system master 222 will continue to monitor for the data it has requested from DP slave 246.

Once the data is returned from memory slave 260, DP master 242 forwards it to DP core 244 for processing. As processing completes, the data is forwarded to DP slave 246. DP slave 246 returns the processed data to master 222, which has been monitoring for it since its initial request.

In both of the described embodiments, there is no inherent loss of bandwidth or latency for master transfers to or from way #1 or way #2. Transfers to these ways remain unaffected by the presence of the data processing core 240 located on way #3.

Figure 3A:
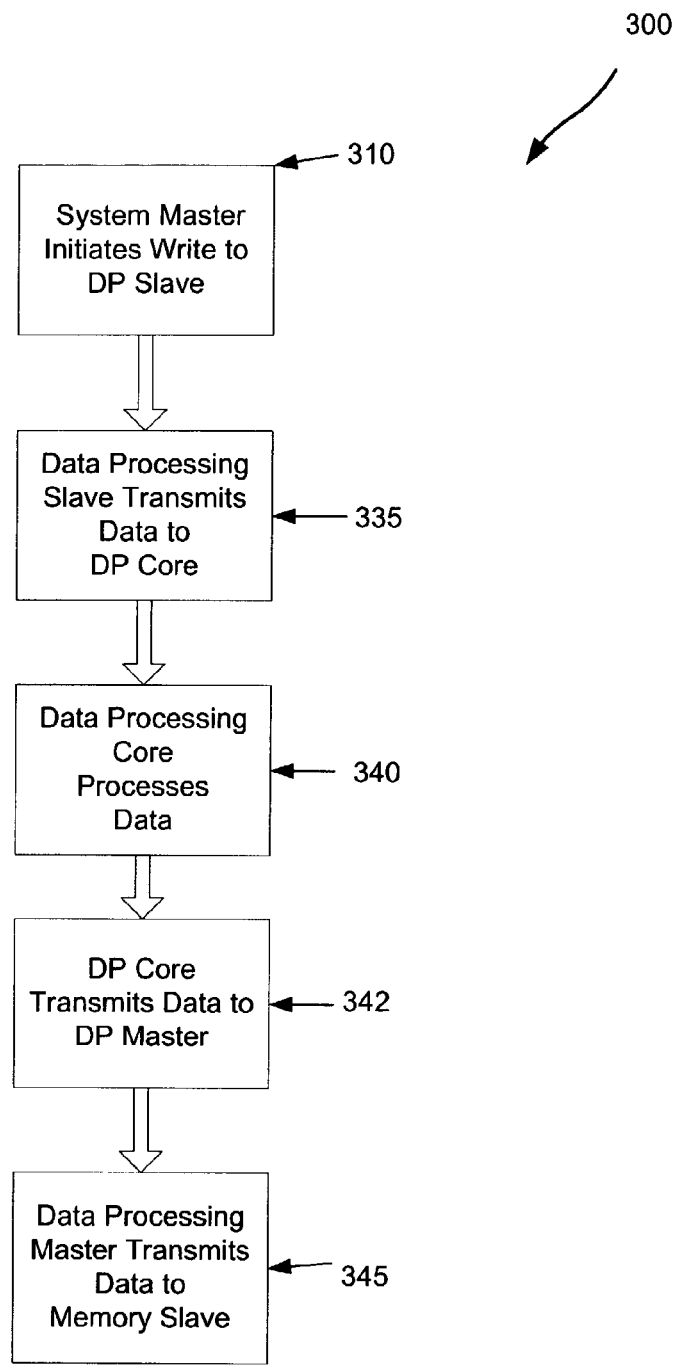
FIG. 3A illustrates a method, employing a data path master/slave, for writing to a slave memory on a target bus.

Turning to FIG. 3A, illustrated is a method 300 for writing to a slave memory on a target bus, employing data path master/slave data processing devices 145 and 240. Although the following steps are discussed in relation to FIG. 1, similar steps are taken for writing data that is to be processed to memory slave 260 from master 220 in FIG. 2.

In step 310, the system master 130 initiates the process of writing data to a DP slave 170. The written data is unprocessed as received by the DP slave 170. In step 335, the DP slave 170 transmits the data to be processed to the DP core 160.

In step 340, the DP core 160 processes the data, be it for encryption, compression, or some other data processing function. Once processing is finished, in step 342 the DP core transmits the processed data to the DP master 150, for eventual transfer to memory slave 190. In step 345, the DP master 150 transmits the processed data to the memory slave 190 through the bus 120 and the bus 125, with permission of the arbiter 110 or the crossbar switch 210.

Figure 3B:
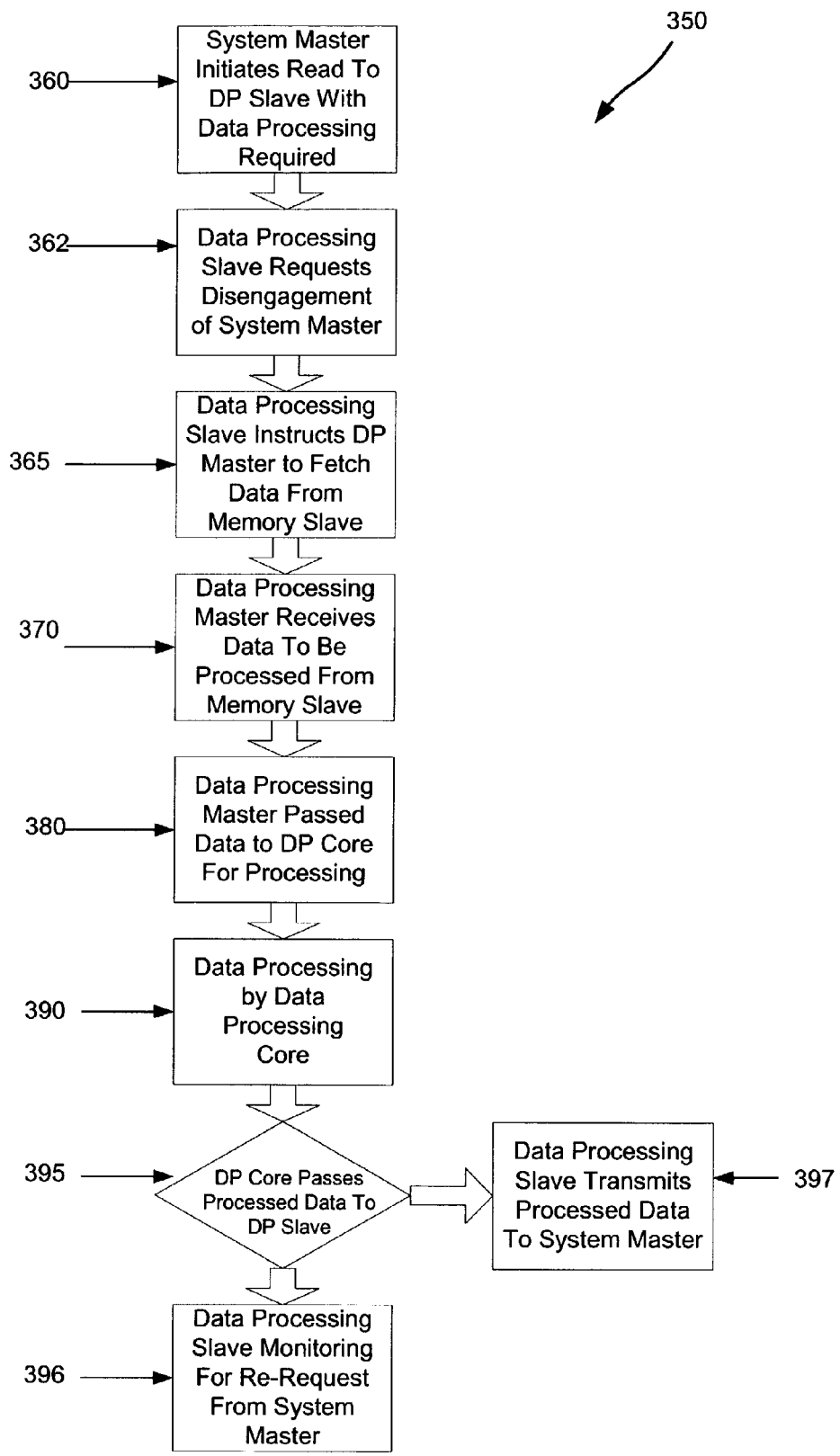
FIG. 3B illustrates a method, employing a data path/master slave, for reading from a slave memory on a target bus.

Turning now to FIG. 3B, illustrated is a method 350 for reading from a memory slave, such as the memory slave 190, on the target bus 125. The read employs the data path/master slave data processing device 145. Although the following steps are discussed in relation to FIG. 1, similar steps are taken for reading data to be processed from memory slave 260 to master 220 of FIG. 2, with some differences in the steps noted.

In step 360, the system master 130 initiates a read sequence of data from DP slave 170. System master 130 expects that the data eventually returned will have been processed by the data processor 145. In step 362, system master 130 is rejected by DP slave 170, since the requested data is not yet available. However, in other embodiments, such as illustrated in FIG. 2, a DP slave can allow the master 220 to remain engaged to the crossbar switch 210.

In step 365, the DP slave 170 instructs the DP master 150 to request a data read from a memory slave. In step 370, the DP master 150 receives the appropriate data from the memory slave 190 over the bus 125. In step 380, the DP master 150 transfers the received data to the DP core for processing. Thereafter, in step 390, the data is processed by the DP core 160.

In step 395, once the DP core 160 is finished, the DP core 160 passes the processed data to the DP slave 170. Step 395 then proceeds to either step 396 or step 397. If the method is one that requires the rejection of the originating master (system master 130 in FIG. 1), in step 396, the DP slave 170 monitors for a re-request for a read from the system master 130. When the re-request is received, the DP slave 170 returns the processed data to the system master 130. However, if the DP slave 246 is not to monitor for a re-request, such as illustrated in FIG. 2, the DP slave 246 will return the processed data immediately to the monitoring system master 220.

It is understood that the present invention can take many forms and embodiments. Accordingly, several variations may be made in the foregoing without departing from the spirit or the scope of the invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A method for writing to a memory slave on a target bus, comprising:

initiating a write, the write requiring data processing, by a system master coupled to a first bus, the first bus coupled to an arbiter;

receiving data from the system master by a data processing slave coupled to a second bus, the second bus coupled to the arbiter, wherein the data processing slave receives only data to be processed from the system master and transmits processed data to the system master wherein the data to be processed and the processed data is passed through the arbiter;

transmitting by the data processing slave data to a data processing core;

processing by the data processing core of the data;

transmitting by the data processing core processed data to a data processing master coupled to the first bus; and transmitting by the data processing master processed data to the memory slave, wherein the data processing master receives only data to be processed from the memory slave and transmits processed data to the memory slave, wherein the data to be processed and the processed data is passed through the arbiter.

2. A method for reading from a memory slave on a target bus, comprising:
- initiating a read of data, the data requiring data processing, by a system master coupled to a first bus, the first bus coupled to an arbiter;
- requesting a disengagement of the system master by a data processing slave coupled to a second bus, the second bus coupled to the arbiter;
- recognizing a read sequence as requiring data processing and additional data to be retrieved by a data processing master coupled to the first bus;
- capturing the data to be processed from a memory slave coupled to the second bus by a data processing master, wherein the data processing master captures only data to be processed from the memory slave and transmits processed data to the memory slave, wherein the data to be processed and the processed data is passed through the arbiter;
- transferring data from the data processing master to a data processing core;
- processing by the data processing core the data;
- transmitting by the data processing core processed data to the data processing slave;
- data holding by the data processing slave, for a period until the system master repeats the original request for data; and
- returning by the data processing slave processed data to the system master, wherein the data processing slave captures only data to be processed from the system master and transmits processed data to the system master, wherein the data to be processed and the processed data is passed through the arbiter.

3. The method of claim 2, further comprising the step of transmitting processed data to the system master from the data processing slave.

4. The method of claim 2, further comprising the step of the data processing slave monitoring for a re-request from the system master.

* * * * *